United States Patent
Goldman

(10) Patent No.: US 10,407,160 B2
(45) Date of Patent: Sep. 10, 2019

(54) VARIABLE IN-FLIGHT WING FOLD SYSTEM

(71) Applicant: Bell Helicopter Textron Inc., Fort Worth, TX (US)

(72) Inventor: Benjamin A. Goldman, Fort Worth, TX (US)

(73) Assignee: BELL HELICOPTER TEXTRON INC., Fort Worth, TX (US)

(*) Notice: Subject to any disclaimer, the term of this patent is extended or adjusted under 35 U.S.C. 154(b) by 396 days.

(21) Appl. No.: 15/424,526

(22) Filed: Feb. 3, 2017

(65) Prior Publication Data

US 2018/0222577 A1 Aug. 9, 2018

(51) Int. Cl.
| | | |
|---|---|---|
| *B64C 11/28* | (2006.01) | |
| *B64C 27/50* | (2006.01) | |
| *B64C 27/46* | (2006.01) | |
| *B64C 27/473* | (2006.01) | |
| *B64C 27/00* | (2006.01) | |
| *B64C 27/06* | (2006.01) | |
| *B64C 29/00* | (2006.01) | |
| *B64C 11/20* | (2006.01) | |

(52) U.S. Cl.
CPC ............ *B64C 11/28* (2013.01); *B64C 27/001* (2013.01); *B64C 27/06* (2013.01); *B64C 27/46* (2013.01); *B64C 27/473* (2013.01); *B64C 27/50* (2013.01); *B64C 29/0033* (2013.01); *B64C 11/20* (2013.01); *B64C 2027/004* (2013.01)

(58) Field of Classification Search
CPC ........... B64C 3/546; B64C 3/56; B64C 11/28; B64C 11/20; B64C 27/001; B64C 27/37; B64C 27/39; B64C 27/473; B64C 27/72; B64C 2027/004; B64C 2027/7216; B64C 2027/7222; F03D 7/0236
See application file for complete search history.

(56) References Cited

U.S. PATENT DOCUMENTS

| | | | |
|---|---|---|---|
| 2,869,649 A | 1/1959 | Dieter | |
| 5,263,846 A | 11/1993 | Smith | |
| 10,287,006 B1* | 5/2019 | Beckman | ................ B64C 27/39 |
| 2010/0150717 A1* | 6/2010 | Turmanidze | .......... B64C 11/003 |
| | | | 416/87 |

FOREIGN PATENT DOCUMENTS

| | | |
|---|---|---|
| EP | 2397408 A2 | 12/2011 |
| EP | 2631179 A1 | 8/2013 |
| EP | 2397408 A3 | 12/2013 |
| EP | 3357812 A1 | 8/2018 |
| JP | H0481391 A | 3/1992 |

OTHER PUBLICATIONS

EPO Examination Report issued in EP Application 17195543.8 dated Nov. 2, 2018, 5 pages; 2355-0001-EP (IN030-16).
EPO Examination Report issued in EP Application 17195543.8 dated May 31, 2018, 5 pages; 2355-0001-EP (IN030-16).
EPO Search Report issued in EP Application 17195543.8 dated May 9, 2018, 4 pages; 2355-0001-EP (IN030-16).
EPO Examination Report issued in EP Application 17195543.8 dated May 6, 2019, 6 pages; 2355-0001-EP.

* cited by examiner

*Primary Examiner* — Nicholas McFall
(74) *Attorney, Agent, or Firm* — Patent Capital Group

(57) ABSTRACT

In one embodiment, an apparatus may comprise a rotor blade. The rotor blade may comprise a plurality of blade segments; one or more attachment fittings for coupling the plurality of blade segments; and one or more actuators for adjusting an orientation of the plurality of blade segments.

17 Claims, 4 Drawing Sheets

VARIABLE IN-FLIGHT WING FOLD SYSTEM

TECHNICAL FIELD

This disclosure relates generally to aircraft design and performance, and more particularly, though not exclusively, to variable in-flight wing or rotor adjustment.

BACKGROUND

There are numerous considerations involved in the design of rotorcraft and other aircraft, including size, weight, power and fuel efficiency, noise and vibration, structural loads, and so forth. In many cases, however, it may be challenging to improve certain aspects of an aircraft without disrupting other aspects. For example, it may be challenging to reduce noise and vibration produced by an aircraft, and/or improve the power and fuel efficiency of an aircraft, without negatively impacting other design and performance aspects of the aircraft.

SUMMARY

According to one aspect of the present disclosure, an apparatus may comprise a rotor blade. The rotor blade may comprise: a plurality of blade segments; one or more attachment fittings for coupling the plurality of blade segments; and one or more actuators for adjusting an orientation of the plurality of blade segments.

DETAILED DESCRIPTION

Figure 1A:
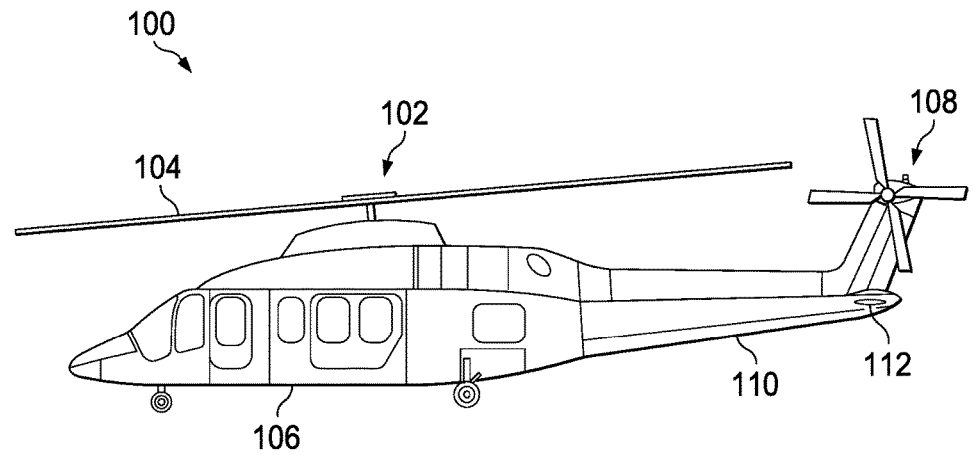
FIGS. 1A, 1B, and 2 illustrate example aircraft in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

Figure 1B:
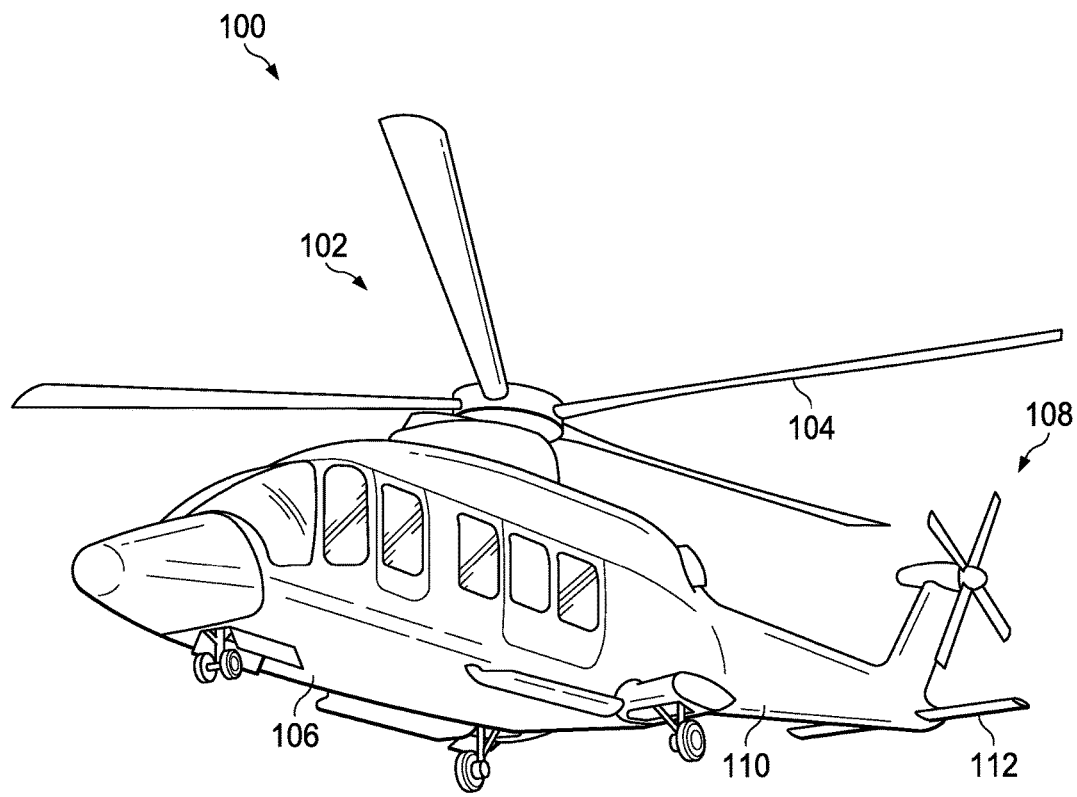

FIGS. 1A and 1B illustrate an example embodiment of a rotorcraft 100. FIG. 1A illustrates a side view of rotorcraft 100, while FIG. 1B illustrates a perspective view of rotorcraft 100. Rotorcraft 100 includes a rotor system 102 with a plurality of rotor blades 104. The pitch of each rotor blade 104 can be managed or adjusted in order to selectively control direction, thrust, and lift of rotorcraft 100. Rotorcraft 100 further includes a fuselage 106, tail rotor or anti-torque system 108, an empennage 110, and a tail structure 112. In the illustrated embodiment, tail structure 112 may be used as a horizontal stabilizer. Torque is supplied to rotor system 102 and anti-torque system 108 using at least one engine.

Figure 2:
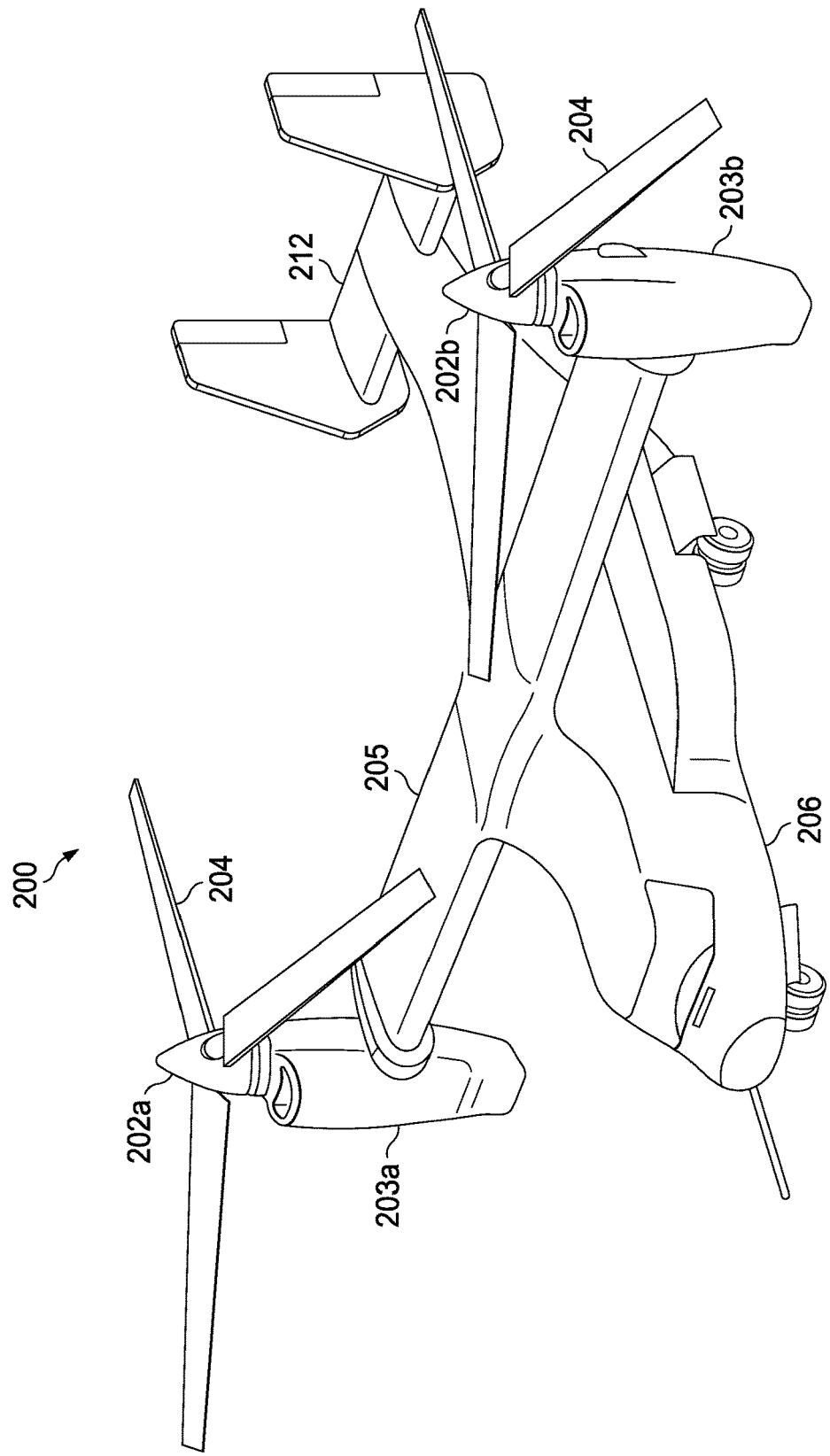

FIG. 2 illustrates a perspective view of an example tiltrotor aircraft 200. Tiltrotor aircraft 200 includes nacelles 203a and 203b, a wing 205, a fuselage 206, and a tail structure 212. Nacelles 203a and 203b respectively include rotor systems 202a and 202b, and each rotor system 202a and 202b includes a plurality of rotor blades 204. Moreover, each nacelle 203a and 203b may include an engine and gearbox for driving rotor systems 202a and 202b, respectively. In some embodiments, nacelles 203a and 203b may each be configured to rotate between a helicopter mode, in which the nacelles 203a and 203b are approximately vertical, and an airplane mode, in which the nacelles 203a and 203b are approximately horizontal. In the illustrated embodiment, tail structure 212 may be used as a vertical stabilizer.

It should be appreciated that rotorcraft 100 of FIGS. 1A and 1B and tiltrotor aircraft 200 of FIG. 2 are merely illustrative of a variety of aircraft that can be used to implement embodiments of the present disclosure. Other aircraft implementations can include, for example, fixed wing airplanes, hybrid aircraft, unmanned aircraft, gyrocopters, a variety of helicopter configurations, and drones, among other examples. Moreover, it should be appreciated that even though aircraft are particularly well suited to implement embodiments of the present disclosure, the described embodiments can also be implemented using non-aircraft vehicles and devices.

During operation, rotorcraft (e.g., rotorcraft 100 or rotorcraft 200) and other aircraft are subjected to various aerodynamic and operational forces. In some cases, these various forces may produce undesirable noise and vibration. Among other examples, noise and vibration can be caused by blade-vortex interaction (BVI) and/or blade tip movement of a rotorcraft. Blade-vortex interaction refers to the interaction between a rotor blade and the vortex wake created by another rotor blade during operation of a rotorcraft. For example, when the rotor is spinning, the tip of each rotor blade may produce a vortex wake. Thus, during operation of a rotorcraft, the respective rotor blades may continuously pass through or near the vortex wake created by other leading rotor blades. In some cases, extreme noise may result when one rotor blade passes through or near the vortex wake of another rotor blade. For example, the interaction of a blade and a vortex may result in a massive change in the pressure distribution of the blade, which may in turn produce a significant amount of noise. Moreover, oblique impact of a blade with a vortex can amplify the resulting noise, as every portion of the blade may collide with the vortex at the same time. The noise produced by the blade-vortex interaction of a rotorcraft can be unpredictable and bothersome. Noise can also be produced by the movement of the tips of the rotor blades during operation of a rotorcraft. For example, when the rotor is spinning, the tip of each rotor blade may produce noise, which may vary based on the blade tip speed and Mach number, among other factors.

The noise and vibration produced during operation of a rotorcraft (e.g., due to blade-vortex interaction and/or blade tip movement) may be undesirable for various reasons. For example, excessive noise from a rotorcraft can be bothersome to pilots, passengers, and bystanders. Similarly, excessive vibration may cause the rotorcraft to shake and thus may negatively impact the comfort of the pilots and passengers. Moreover, excessive vibration can be harmful to a rotorcraft, as it can negatively impact the structural integrity, fatigue life, and performance of the rotorcraft. Accordingly, controlling or reducing the noise and vibration produced during operation of rotorcraft and other aircraft is an important design consideration.

Power and fuel efficiency is another important design consideration for rotorcraft and other aircraft. For example, reducing the power required to operate a rotorcraft reduces its fuel consumption, which may enable the mission length to be increased without increasing the fuel capacity, or may enable the fuel capacity to be decreased without decreasing the mission length (e.g., thus decreasing the weight of the rotorcraft, which in turn decreases the load requirements of its components). It may be challenging, however, to improve the power and fuel efficiency of a rotorcraft without disrupting other design and performance considerations. As an example, the power required to generate lift may vary for different operational modes of a rotorcraft. For example, more power may be required to generate lift when a rotorcraft is in hover than when the rotorcraft is in forward flight. Of course, a rotorcraft must be capable of generating the requisite lift for all operational modes, including hover, and thus may use more power than necessary in certain operational modes, such as forward flight.

Reducing noise and vibration, and improving power and fuel efficiency, are important design considerations for rotorcraft and other aircraft. It may be challenging, however, to achieve these design goals in a cost-efficient manner and without disrupting other design and performance considerations. For example, reducing noise and vibration without increasing the size and/or weight of a rotorcraft can be challenging. In some cases, for example, noise and vibration could be reduced by increasing the mass of a component and/or stiffening the component. However, these approaches increase the weight of a rotorcraft and thus may negatively impact its performance (e.g., by increasing fuel consumption and/or increasing structural loads on components of the rotorcraft). In some cases, the speed of the rotor blades could be reduced to reduce noise and power. Slowing the rotor, however, may have various performance drawbacks. For example, slowing the blade tip speed can reduce the amount of lift generated by the rotor, which may be particularly problematic in hover, as more power is needed to generate lift in hover. Slowing the rotor can also introduce significant dynamic effect, including increased structural loads on the rotor and hub due to the decreased inertia. In some cases, rotor blades could be designed with particular dimensions and/or shapes intended to reduce noise and power (e.g., using shorter blade lengths or a smaller rotor radius), but those approaches have similar drawbacks, including decreasing the lift generated by the rotor, which again is particularly problematic in hover. In some cases, rotor blades could be designed using a telescoping approach in order to enable the rotor radius to be adjustable (e.g., rotor blades that can collapse into themselves like a telescope). A telescoping approach, however, may drastically reduce control area (e.g., by reducing the width of certain portions of the blade) and thus may limit control authority. Moreover, collapsing or contracting a telescoped blade would result in the majority of the blade mass being concentrated at the tip of the blade, which may further limit control authority.

This disclosure describes various embodiments of a variable in-flight wing fold system, which can be used to reduce noise and vibration and improve power and fuel efficiency for rotorcraft and other aircraft without the performance drawbacks associated with other approaches. In some embodiments, for example, the blades of a rotor are each split into multiple radial segments connected by flexures, and actuators are used to allow the shape or geometry of each blade to be varied during flight. For example, the blades can be fully expanded when more power is needed to generate lift (e.g., when a rotorcraft is in hover), and the blades can be contracted or folded when less power is needed (e.g., during forward flight) and/or when noise and vibration need to be reduced. Contracting the rotor blades, for example, reduces the radius of the rotor and thus reduces the amount of power required to turn the rotor. In this manner, the power and fuel efficiency of a rotorcraft can be improved, thus enabling the mission length to be increased without increasing the fuel capacity, or enabling the fuel capacity to be decreased without decreasing the mission length. Moreover, decreasing the fuel capacity results in less fuel weight and thus decreases the weight of the rotorcraft, which in turn decreases the load requirements on the components of the rotorcraft.

Moreover, adjusting the geometry of the blades and/or reducing the rotor radius can reduce noise and vibration. For example, altering the blade geometry can reduce noise and vibration caused by blade-vortex interaction. In some embodiments, for example, a fully expanded and/or straight blade can be contracted into an uneven or jagged shape that forms a point on the leading edge of the blade. In this manner, when the rotor blade interacts with a vortex produced by another leading blade, the impact of the vortex is de-phased by the pointed edge of the rotor blade. For example, rather than impacting the entire blade all at once, the vortex gradually impacts the blade by first impacting the pointed portion and then cascading down the remainder of the blade. In this manner, the impact of the blade and vortex results in a much better pressure profile and reduces the noise and vibration produced by the blade-vortex interaction. As another example, reducing the rotor radius can reduce the noise and vibration produced at the blade tips. For example, reducing the rotor radius without modifying the angular velocity reduces the tip speed and tip Mach number, and thus reduces the noise and vibration produced at the blade tips.

The embodiments described throughout this disclosure provide numerous advantages. For example, the described embodiments enable the blades of a rotorcraft to be contracted and expanded in-flight as appropriate for varying circumstances. The flexibility of these embodiments achieves the performance benefits of the full rotor radius (e.g., for generating lift in hover), while also achieving the benefits of other rotor blade geometries (e.g., improved power efficiency and reduction of noise and vibration). Moreover, these embodiments allow these various advantages to be achieved without reducing the rotations per minute (RPMs) of the rotor. In some cases, for example, altering the blade geometry in flight can provide a 3-6 decibel reduction in noise. Reduced noise and vibration may be desirable to pilots, passengers, and bystanders, and may improve the stealth of military aircraft, among other benefits. Moreover, because the blades can be contracted without significantly reducing the blade surface area, control authority can be maintained even when the blades are contracted. The embodiments described throughout this disclosure can be used to enable dynamic wing or rotor adjustment for any aircraft, rotorcraft, drone, or other rotor system.

Example embodiments that may be used to implement variable in-flight wing folding are described below with more particular reference to the remaining FIGURES.

Figure 3A:
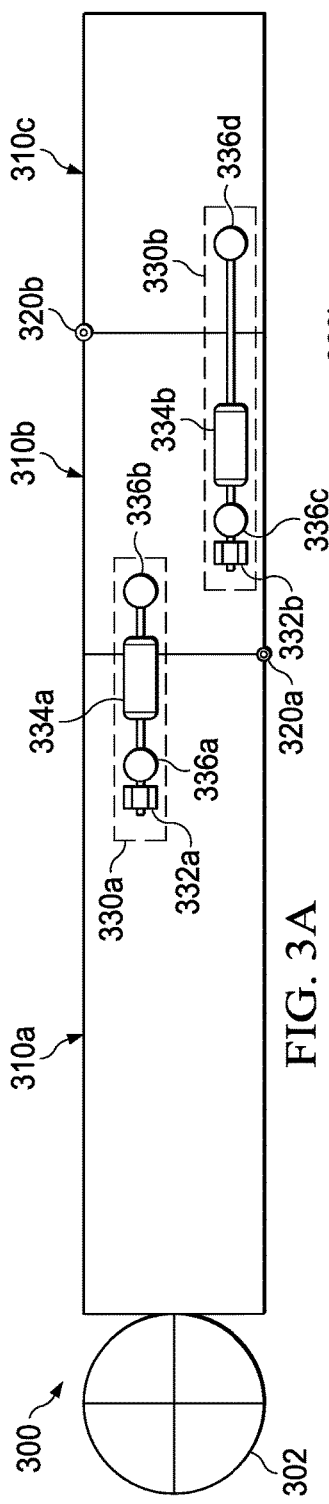
FIGS. 3A-C illustrate an example embodiment of an adjustable rotor blade for a variable in-flight wing fold system.
Figure 3B:
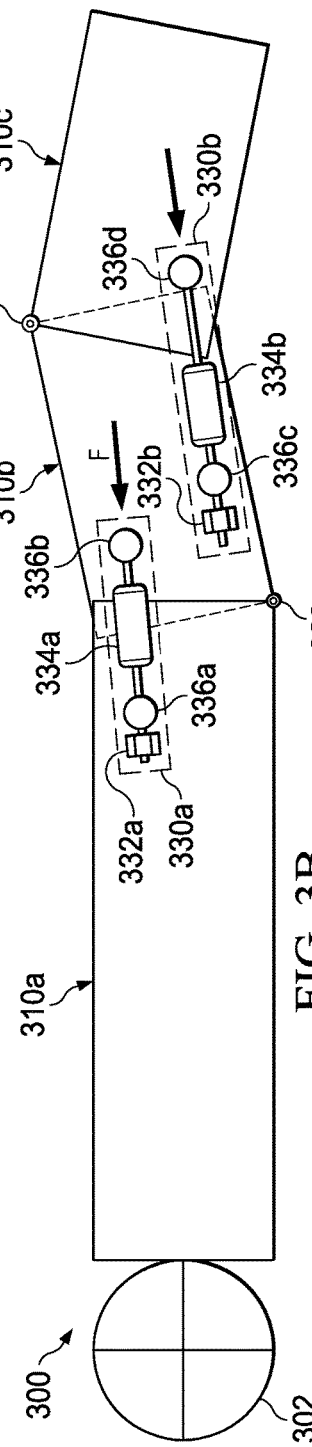
Figure 3C:
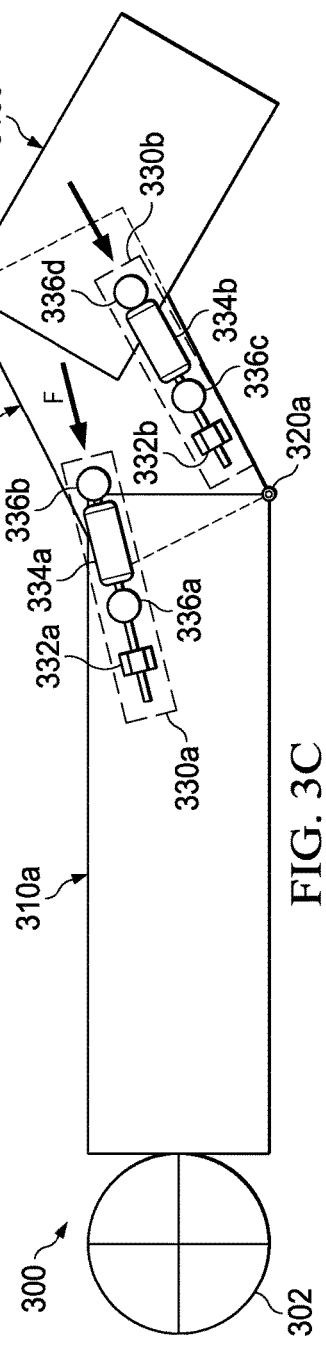

FIGS. 3A-C illustrate an example embodiment of an adjustable rotor blade 300 for a variable in-flight wing fold system. FIG. 3A illustrates rotor blade 300 when it is fully expanded, while FIGS. 3B and 3C illustrate rotor blade 300 when it has been contracted in order to form alternative rotor geometries. In FIGS. 3A-3C, rotor blade 300 is attached to a rotor hub 302, which may be a component used for attaching the blades 300 of a rotor. Thus, although the illustrated embodiment only portrays a single rotor blade 300 for simplicity, actual embodiments may include a plurality of rotor blades 300 connected to rotor hub 302.

In the illustrated embodiment, rotor blade 300 includes a plurality of radial blade segments 310, flexures 320, and actuators 330. The plurality of radial blade segments 310 are connected using flexures 320, and the orientation of adjacent blade segments 310 can be adjusted using actuators 330, allowing the shape of rotor blade 300 to be varied in-flight. For example, in the illustrated embodiment, the plurality of blade segments 310 includes an inboard blade segment 310a, a middle blade segment 310b, and an outboard blade segment 310c. Flexure 320a is used to connect inboard blade segment 310a to middle blade segment 310b, and flexure 320b is used to connect middle blade segment 310b to outboard blade segment 310c. Moreover, actuator 330a connects to inboard blade segment 310a and middle blade segment 310b and enables their relative orientation to be adjusted. Similarly, actuator 330b connects to middle blade segment 310b and outboard blade segment 310c and enables their relative orientation to be adjusted. Actuators 330a and 330b each include a hydraulic clamp 332, a linear motor 334, and multiple ball joints 336.

Accordingly, in the illustrated embodiment, rotor blade 300 is split into radial blade segments 310 connected by flexures 320. Flexures 320, for example, may be mechanical components connecting adjacent blade segments 310 in a manner that allows the orientation of the blade segments 310 to be adjustable. Actuators 330 enable the shape of rotor blade 300 to be varied in-flight using linear motors 334 to drive a series of shafts linking the inboard, middle, and outboard blade segments 310a-c. For example, linear motors 334 are attached to blade segments 310 using ball joints 336. Moreover, linear motors 334 can apply a force that counteracts the centrifugal force to contract or expand rotor blade 300. In some embodiments, centrifugal force may be used to assist actuators 330 in the re-expansion of rotor blade 300. Moreover, in some embodiments, middle blade segment 310b may be fully or partially hollowed to allow inboard blade segment 310a and outboard blade segment 310c to partially fold inside of middle blade segment 310b when rotor blade 300 is contracted. In other embodiments, however, blade segments 310a-c may be designed to be partially overlapping or stacked when rotor blade 300 is contracted.

Figure 4:
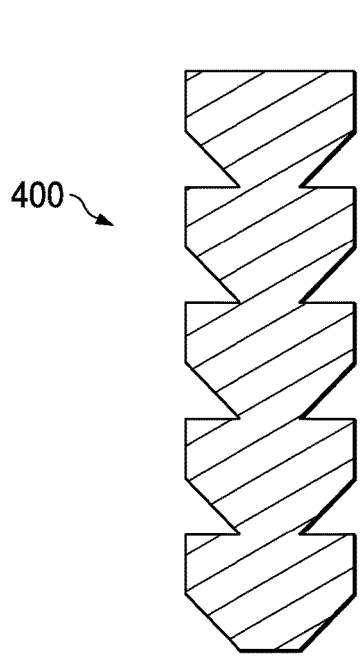
FIG. 4 illustrates a cross section of a linear motor shaft for an adjustable rotor blade in a variable in-flight wing fold system.

Hydraulic clamps 332 are used as locking guides for setting the orientation of the blade segments 310a-c and fastening the linear motor shafts 334 in place. A cross section of an example embodiment of a linear motor shaft 334 is illustrated in FIG. 4. The cross section of the linear motor shaft 334 allows for a secure hold by the hydraulic clamps 332 during flight. The use of hydraulic clamps 332 provides a safeguard in the event of a blade or power failure. For example, in the event of a blade failure, hydraulic clamps 332 allow the faulty blade 300 to be expanded using centrifugal force to match the configuration of the remaining blades. For example, a faulty blade 300 may be expanded by releasing the hydraulic clamps 332 attaching the radial segments 310 of the blade, allowing centrifugal force to fully expand the faulty blade. Moreover, the hydraulic clamps 332 also provide a safeguard in the event of a power failure, as the hydraulic clamps 332 enable a rotor blade 300 to maintain its current configuration even if power is lost.

In this manner, the illustrated embodiment enables the size and/or geometry of rotor blade 300 to be dynamically adjusted during flight. For example, in FIG. 3A, rotor blade 300 is fully expanded. In FIGS. 3B and 3C, however, rotor blade 300 is partially contracted in order to form alternative rotor geometries. The illustrated configurations of rotor blade 300 are merely examples, however, as there are an infinite number of potential configurations of rotor blade 300. For example, rotor blade 300 can be contracted or expanded by any extent depending on the desired configuration. In some embodiments, for example, rotor blade 300 can be contracted or expanded to any position along a track formed by the locking guides. In this manner, a rotorcraft can adjust the configuration of the rotor blades 300 for different operational modes and circumstances. In some embodiments, for example, the configuration of the rotor blades 300 may vary for hover, forward flight, and/or certain locations (e.g., noise-sensitive or regulated areas), among other examples. Moreover, in some embodiments, an optimal configuration of the rotor blades 300 may be predetermined or preconfigured for the various operational modes and circumstances, and the rotorcraft may automatically adjust the configuration of the rotor blades 300 as appropriate.

For example, when in hover, a rotorcraft may fully expand the rotor blades 300, as hover requires more power to generate lift. When in forward flight, however, the rotorcraft may contract the rotor blades 300 in order to improve power and fuel efficiency and/or reduce noise and vibration, as forward flight requires less power to generate lift.

Contracting the rotor blades 300, for example, reduces the radius of the rotor and thus reduces the amount of power required to turn the rotor. In this manner, the power and fuel efficiency of a rotorcraft can be improved, thus enabling the mission length to be increased without increasing the fuel capacity, or enabling the fuel capacity to be decreased without decreasing the mission length. Moreover, decreasing the fuel capacity results in less fuel weight and thus decreases the weight of the rotorcraft, which in turn decreases the load requirements on the components of the rotorcraft.

Contracting the rotor blades 300 can also reduce noise and vibration. For example, contracting the rotor blades 300 to alter the blade geometry can reduce noise and vibration caused by blade-vortex interaction. In some embodiments, for example, a fully expanded and/or straight blade (e.g., as illustrated in FIG. 3A) can be contracted into an uneven or jagged shape that forms a point on the leading edge of the blade (e.g., as illustrated in FIGS. 3B and 3C). In this manner, when the rotor blade 300 interacts with a vortex produced by another leading blade, the impact of the vortex is de-phased by the pointed edge of the rotor blade 300. For example, rather than impacting the entire rotor blade 300 all at once, the vortex gradually impacts the blade by first impacting the pointed portion and then cascading down the remainder of the blade. In this manner, the impact of the blade 300 and vortex results in a much better pressure profile and reduces the noise and vibration produced by the blade-vortex interaction. As another example, reducing the rotor radius can reduce the noise and vibration produced at the tip of each rotor blade 300. For example, reducing the rotor radius without modifying the angular velocity reduces the tip speed and tip Mach number, and thus reduces the noise and vibration produced at the tip of each rotor blade 300.

Moreover, in the illustrated embodiment, control authority is maintained even when the rotor blades 300 are contracted, as the blades can be contracted without significantly reducing the blade surface or control area.

To provide an example, with respect to a particular embodiment of a rotor blade, contracting the rotor blade with the first flexure at 0.75 R and a 45° fold results in a 14% reduction in rotor radius, a 21.5% reduction in surface area, and $F_c$ (centrifugal force)≈20,000 lb.

Although FIGS. 3A-C illustrate one example embodiment for an adjustable rotor blade 300, other embodiments may use any suitable approach for adjusting the size, shape, and/or geometry of a rotor blade 300. For example, in some embodiments, alternative components or implementations may be used for flexures 320 and/or actuators 330. In some embodiments, for example, actuators 330 may include a cylindrical hinge.

FIG. 4 illustrates a cross section of a linear motor shaft 400 for an adjustable rotor blade in a variable in-flight wing fold system. In some embodiments, for example, linear motor shaft 400 may be used to implement linear motor 334 of rotor blade 300 from FIGS. 3A-C. For example, in some embodiments, an actuator for contracting or expanding a rotor blade (e.g., as described throughout this disclosure) may be implemented using linear motor shaft 400. The cross section of linear motor shaft 400 allows for a secure hold by the hydraulic clamps of the actuator during flight.

Figure 5:
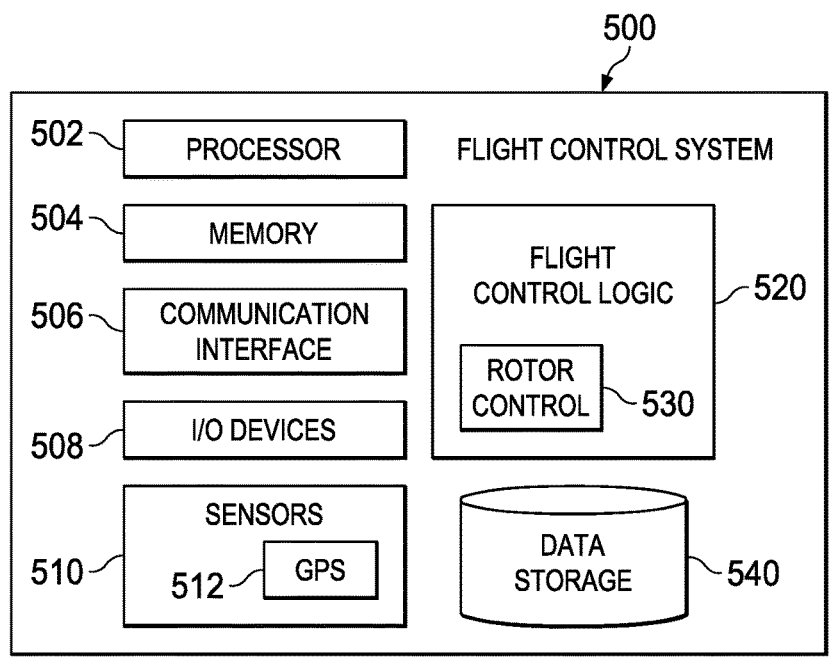
FIG. 5 illustrates a block diagram of a flight control system with variable in-flight wing folding control.

FIG. 5 illustrates a block diagram of a flight control system 500 with variable in-flight wing folding control. Flight control system 500, for example, may facilitate control of an aircraft, such as a rotorcraft. In some embodiments, flight control system 500 may include functionality related to navigation, autopilot, aircraft health diagnostics, communication capabilities, and so forth. Moreover, in some embodiments, flight control system 500 may also include functionality for controlling a variable in-flight wing folding system, such as the adjustable rotor system of FIGS. 3A-C.

In the illustrated embodiment, flight control system 500 includes a processor 502, memory 504, communication interface 506, input/output (I/O) devices 508, sensors 510, flight control logic 520, and data storage 540. In some implementations, the various illustrated components and functionality of flight control system 500 may be combined or integrated into a single system, or divided and distributed among multiple different systems.

Processor 502 may be used to execute instructions associated with the functionality of flight control system 500. Processor 502 may be any type of processing device, including a traditional microprocessor, microcontroller, application-specific integrated circuit (ASIC), field programmable gate array (FPGA), digital signal processor (DSP), programmable logic device, programmable logic array (PLA), microcode, instruction set, emulated or virtual machine processor, or any similar "Turing-complete" device, combination of devices, or logic elements (hardware or software) that permit the execution of instructions and/or logic.

Memory 504 may be used to store data and/or code used by processor 502. Communication interface 506 may be used to communicate, interoperate, and otherwise interact with external systems and components (and/or with other distributed components of flight control system 500). Input/output (I/O) devices 508 may include any components that facilitate interaction with flight control system 500, such as a display, keyboard, and/or any other switches or controls.

Sensors 510 may include any components used to detect or measure aspects of the operational environment of the aircraft. In the illustrated embodiment, sensors 510 include a GPS chipset 512 for determining the location of the aircraft. Sensors 510 may also include any other number or type of sensors, including sensors for detecting altitude, speed, aircraft health, noise, vibration, structural loads, proximity to other objects, and so forth.

Data storage 540 may be used to store information associated with flight control system 500, such as navigation and/or mapping information, mission information, and configuration information, among other examples.

Flight control logic 520 may include a collection of logic and/or components that facilitate control of an aircraft. In some embodiments, flight control logic 520 and/or its underlying components may be implemented using machine executable logic embodied in hardware- and/or software-based components. For example, in the illustrated embodiment, flight control logic 520 includes rotor control logic 530 for controlling and/or configuring a variable in-flight wing folding system, such as the adjustable rotor system from FIGS. 3A-C.

For example, rotor control logic 530 may be used to adjust the configuration of the blades of a rotorcraft for different operational modes and circumstances. In some embodiments, for example, an optimal configuration of the rotor blades may be predetermined or preconfigured for various operational modes and circumstances. Rotor control logic 530 may then automatically adjust the configuration of the rotor blades, when appropriate, based on the optimal configuration for the respective operational modes and circumstances. For example, in some embodiments, the particular rotor blade configurations may be stored using data storage 540. Moreover, rotor control logic 530 may automatically adjust the configuration of the rotor blades when transitioning to a new operational mode or when certain circumstances are detected.

In some embodiments, for example, different rotor blade configurations may be defined for hover, forward flight, and/or certain locations (e.g., noise-sensitive or regulated areas), among other examples. For example, when in hover, a rotorcraft may fully expand the rotor blades, as hover requires more power to generate lift. When in forward flight, however, the rotorcraft may contract the rotor blades in order to improve power and fuel efficiency and/or reduce noise and vibration, as forward flight requires less power to generate lift.

In some embodiments, a rotorcraft may also contract the rotor blades to reduce noise and vibration when entering certain locations or areas, such as noise-sensitive or regulated areas. Noise-sensitive areas, for example, could include highly populated geographical areas, geographical areas subject to noise-related government regulations, and so forth. Accordingly, in some embodiments, rotor control logic 530 may automatically contract the rotor blades upon determining that the rotorcraft is within or near a noise-sensitive or regulated area.

In some embodiments, for example, rotor control logic 530 may use geo-fencing functionality to determine when the rotorcraft is within or near a noise-sensitive area. For example, GPS chipset 512 can be used to determine the location of the rotorcraft, and data storage 540 can be used to store geographical or mapping data identifying the noise-sensitive or regulated areas. Accordingly, rotor control logic 530 may contract the rotor blades upon determining that the location of the rotorcraft (as determined using GPS chipset 512) is within or near the defined noise-sensitive areas (as defined by mapping data stored in data storage 540).

In some embodiments, rotor control logic 530 may evaluate a variety of operational characteristics of the rotorcraft when determining whether to contract or expand the rotor blades. For example, in some embodiments, rotor control logic 530 may evaluate the location, noise level, vibration, structural loads, speed, direction, and/or altitude of the rotorcraft, among other examples. Accordingly, in some embodiments, sensors 510 of flight control system 500 may include a location sensor (e.g., GPS chipset 512), noise sensor, vibration sensor, load sensor, speed sensor, directional sensor, and/or altitude sensor. In this manner, based on the operational characteristics detected by sensors 510, rotor control logic 530 may contract the rotor blades to reduce noise and vibration and/or improve fuel efficiency, or rotor control logic 530 may expand the rotor blades to improve performance (e.g., generating increased lift, improving control authority, and so forth). For example, rotor control logic 530 may contract the rotor blades to reduce noise and vibration based on location (e.g., the rotorcraft is in or near noise-sensitive areas), noise level (e.g., excessive noise is generated by the rotorcraft), vibration, loads, and/or altitude (e.g., low altitudes in which excessive noise can be heard by bystanders). As another example, rotor control logic 530 may contract the rotor blades to improve power and fuel efficiency, for example, based on the operational mode, speed, and/or direction of a rotorcraft, such as when the rotorcraft is in forward flight or in other operational modes that require lower power. As another example, rotor control logic 530 may expand the rotor blades for improved performance, for example, to generate more lift when the rotorcraft is in hover, generate more lift if the rotorcraft is losing altitude in forward flight, improve control authority, and so forth.

Moreover, in some embodiments, flight control system 500 may also include fault detection and/or safety mechanisms, for example, to ensure that all rotor blades are properly expanded or contracted using the appropriate blade configuration. For example, if a fault occurs during expansion or contraction of a rotor blade, the faulty rotor blade may be in a different configuration than the remaining rotor blades, resulting in an imbalance that may negatively impact the ability to control the rotorcraft. Accordingly, fault detection and/or safety mechanisms may be used to minimize the safety risk associated with blade failures.

In some embodiments, for example, the configuration of each blade may be tracked by flight control system 500. For example, sensors 510 may be used to track the position of the actuators on each blade, which may serve as a reference for the blade configuration and orientation. Accordingly, the sensors may be used to detect blade failures, for example, by determining that a particular blade is not in the intended configuration. In the event of a blade failure, the remaining blades may be contracted or expanded to match the configuration of the faulty blade, or alternatively, the faulty blade may be expanded using centrifugal force to match the configuration of the remaining blades. For example, in some embodiments, a faulty blade may be expanded by releasing the hydraulic clamps attaching the radial segments of the blade, allowing centrifugal force to fully expand the faulty blade. Moreover, the hydraulic clamps also provide a safeguard in the event of a power failure, as the hydraulic clamps enable a rotor blade to maintain its current configuration even if power is lost.

Finally, in some embodiments, flight control system 500 may also include manual controls that allow a pilot to manually control and configure the rotor blades. For example, if a rotorcraft is losing altitude in forward flight while the rotor blades are contracted, the pilot may manually expand the rotor blades to generate more lift and increase or sustain the desired altitude.

Figure 6:
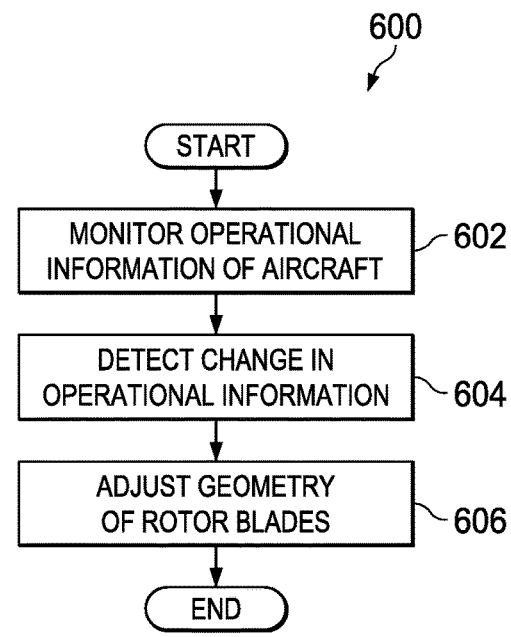
FIG. 6 illustrates a flowchart for an example embodiment of variable in-flight wing folding.

FIG. 6 illustrates a flowchart 600 for an example embodiment of variable in-flight wing folding. Flowchart 600 may be implemented, for example, using the embodiments described throughout this disclosure (e.g., using rotor blade 300 of FIGS. 3A-C and/or flight control system 500 of FIG. 5).

The flowchart may begin at block 602 by monitoring operational information associated with an aircraft. In some embodiments, for example, the aircraft may be a rotorcraft. Moreover, in some embodiments, the operational information may be monitored using a flight control system and/or one or more sensors. For example, the sensors may each be used to detect or measure a particular operational attribute associated with the rotorcraft, and the flight control system may monitor the operational attributes collectively provided by the sensors. In some embodiments, for example, sensors may be used to monitor the location, noise level, vibration, structural loads, speed, direction, and/or altitude of a rotorcraft, among other examples.

The flowchart may then proceed to block 604 to detect a change in the operational information associated with the aircraft. In some embodiments, for example, a change may be detected in the location, noise level, vibration, structural loads, speed, direction, and/or altitude of a rotorcraft, among other examples. The change in operational information, for example, may be caused by a rotorcraft transitioning from hover to forward flight (or vice versa), entering a noise-sensitive area or region, and so forth.

The flowchart may then proceed to block 606 to adjust the geometry of the rotor blades based on the detected change in the operational information.

In some embodiments, for example, a rotorcraft may include a rotor with adjustable rotor blades (e.g., rotor blade 300 of FIGS. 3A-C) that can be contracted or expanded to allow the shape or geometry of the blades to be varied in flight. For example, each rotor blade may be split into multiple radial segments connected by flexures, and may include actuators for adjusting the orientation of the respective blade segments. In this manner, the size, shape, and geometry of the rotor blades can be adjusted in flight for different operational modes and circumstances. For example, in some embodiments, an optimal configuration of the rotor blades may be predetermined or preconfigured for different operational modes and circumstances, and the rotorcraft may automatically adjust the configuration of the rotor blades when particular operational modes or circumstances are detected.

In some embodiments, for example, different rotor blade configurations may be defined for hover, forward flight, and/or certain locations (e.g., noise-sensitive or regulated areas), among other examples. For example, when in hover, a rotorcraft may fully expand the rotor blades, as hover requires more power to generate lift. When in forward flight, however, the rotorcraft may contract the rotor blades in order to improve power and fuel efficiency and/or reduce noise and vibration, as forward flight requires less power to generate lift. Moreover, in some embodiments, a rotorcraft may also contract the rotor blades to reduce noise and vibration when entering certain locations or areas, such as noise-sensitive or regulated areas. Accordingly, when a change in the operational attributes of a rotorcraft is detected, the rotor blades may be adjusted using the optimal configuration for the particular circumstances.

At this point, the flowchart may be complete. In some embodiments, however, the flowchart may restart and/or certain blocks may be repeated.

The flowcharts and diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

The embodiments described throughout this disclosure may be implemented using logic, instructions, and/or other information stored on any suitable type of tangible, non-transitory storage medium (for example, random access memory (RAM), read only memory (ROM), field programmable gate array (FPGA), erasable programmable read only memory (EPROM), electrically erasable programmable ROM (EEPROM), or microcode), software, hardware (for example, processor instructions or microcode), or in any other suitable component, device, element, or object where appropriate and based on particular needs. A non-transitory storage medium herein is expressly intended to include any non-transitory special-purpose or programmable hardware configured to provide the disclosed operations, or to cause a processor to perform the disclosed operations. A non-transitory storage medium also expressly includes a processor having stored thereon hardware-coded instructions, and optionally microcode instructions or sequences encoded in hardware, firmware, or software.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. An apparatus, comprising:
   a rotor blade, comprising:
      a plurality of blade segments;
      one or more attachment fittings for coupling the plurality of blade segments; and
      one or more actuators for adjusting an orientation of the plurality of blade segments;
   wherein the one or more actuators comprise at least one of:
      one or more linear motors for adjusting the orientation of the plurality of blade segments, the one or more linear motors coupled to the plurality of blade segments by one or more ball joints; and
      one or more hydraulic clamps for locking the orientation of the plurality of blade segments.

2. The apparatus of claim 1, wherein the one or more actuators are configured to contract the rotor blade.

3. The apparatus of claim 2, wherein the one or more actuators are further configured to contract the rotor blade to form a pointed edge.

4. The apparatus of claim 1, wherein the one or more actuators are configured to expand the rotor blade.

5. The apparatus of claim 1, wherein the plurality of blade segments comprises an inboard blade segment, a middle blade segment, and an outboard blade segment.

6. The apparatus of claim 5, wherein the one or more attachment fittings comprise one or more flexures.

7. The apparatus of claim 6, wherein the one or more flexures comprise:
   a first flexure for coupling the inboard blade segment and the middle blade segment; and
   a second flexure for coupling the middle blade segment and the outboard blade segment.

8. The apparatus of claim 5, wherein the one or more actuators comprise:

a first actuator for adjusting a first orientation of the inboard blade segment and the middle blade segment; and a second actuator for adjusting a second orientation of the middle blade segment and the outboard blade segment.

9. A rotorcraft, comprising:

a fuselage; and a rotor comprising a plurality of rotor blades, wherein the plurality of rotor blades comprises one or more adjustable rotor blades, wherein the one or more adjustable rotor blades each comprise:

a plurality of blade segments;

one or more attachment fittings for coupling the plurality of blade segments; and one or more actuators for adjusting an orientation of the plurality of blade segments;

wherein the one or more actuators comprise at least one of:

one or more linear motors for adjusting the orientation of the plurality of blade segments, the one or more linear motors coupled to the plurality of blade segments by one or more ball joints; and one or more hydraulic clamps for locking the orientation of the plurality of blade segments.

10. The rotorcraft of claim 9, wherein the one or more actuators are configured to contract the one or more adjustable rotor blades during flight to reduce noise.

11. The rotorcraft of claim 9, wherein the one or more actuators are configured to contract the one or more adjustable rotor blades during flight to reduce vibration.

12. The rotorcraft of claim 9, wherein the one or more actuators are configured to contract the one or more adjustable rotor blades during flight to reduce power usage.

13. The rotorcraft of claim 9, wherein the one or more actuators are configured to expand the one or more adjustable rotor blades during flight to increase lift generated by the rotor.

14. A method, comprising:

monitoring operational information associated with a rotorcraft, wherein the rotorcraft comprises a rotor, and wherein the rotor comprises a plurality of rotor blades;

detecting a change in the operational information associated with the rotorcraft; and adjusting a geometry of the plurality of rotor blades based on the change in the operational information associated with the rotorcraft;

wherein each of the rotor blades comprises a plurality of blade segments, the method further comprising adjusting an orientation of the plurality of blade segments using one or more actuators, wherein the one or more actuators comprise at least one of:

one or more linear motors for adjusting the geometry of the plurality of blade segments, the one or more linear motors coupled to the plurality of blade segments by one or more ball joints; and one or more hydraulic clamps for locking the orientation of the plurality of blade segments.

15. The method of claim 14, wherein adjusting the geometry of the plurality of rotor blades comprises adjusting an orientation of a plurality of blade segments associated with each rotor blade of the plurality of rotor blades.

16. The method of claim 14, wherein adjusting the geometry of the plurality of rotor blades comprises contracting the plurality of rotor blades.

17. The method of claim 16, wherein detecting the change in the operational information associated with the rotorcraft comprises determining that the rotorcraft is entering a noise-sensitive area.

* * * * *